United States Patent
LeBaron et al.

(10) Patent No.: US 11,481,806 B2
(45) Date of Patent: *Oct. 25, 2022

(54) MANAGEMENT OF CANNIBALISTIC ADS TO REDUCE INTERNET ADVERTISING SPENDING

(71) Applicant: Taskmaster Technologies Inc., San Juan Bautista, CA (US)

(72) Inventors: Matt LeBaron, Salinas, CA (US); John Holsworth, Livermore, CA (US)

(73) Assignee: Taskmaster Technologies Inc., San Juan Bautista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,449

(22) Filed: Sep. 3, 2020

(65) Prior Publication Data

US 2022/0067783 A1 Mar. 3, 2022

(51) Int. Cl.
*G06Q 30/02* (2012.01)
*G06F 16/951* (2019.01)

(52) U.S. Cl.
CPC ....... *G06Q 30/0256* (2013.01); *G06F 16/951* (2019.01); *G06Q 30/0247* (2013.01); *G06Q 30/0249* (2013.01); *G06Q 30/0277* (2013.01)

(58) Field of Classification Search
USPC ........................................ 705/14, 319, 14.54
See application file for complete search history.

(56) References Cited

U.S. PATENT DOCUMENTS

| 8,364,529 | B1* | 1/2013 | Zwicky | G06Q 30/0244 705/14.54 |
| 8,396,742 | B1* | 3/2013 | Blume | G06Q 30/0246 705/14.1 |
| 8,706,548 | B1* | 4/2014 | Blume | G06Q 30/0256 705/14.1 |
| 2008/0010270 | A1* | 1/2008 | Gross | G06Q 30/0277 707/999.005 |
| 2009/0171721 | A1* | 7/2009 | LeBaron | G06Q 30/0256 705/14.54 |
| 2009/0187557 | A1* | 7/2009 | Hansen | G06F 16/951 707/999.005 |
| 2009/0299998 | A1* | 12/2009 | Kim | G06F 16/951 707/999.005 |

(Continued)

OTHER PUBLICATIONS

An Advertiser Centered Approach to Improve Sponsored Search Effectiveness (Year: 2015).*

(Continued)

*Primary Examiner* — Gautam Ubale
(74) *Attorney, Agent, or Firm* — Soquel Group LLC

(57) ABSTRACT

Generating an estimate of reclaimed ad spend for an Internet advertising campaign, by receiving a set of keywords, where each keyword corresponds to a paid ad that is supplied to a search engine, gathering a cannibalism score for each paid ad, where a cannibalism score indicates that the presence of a designated paid ad in a SERP reduces the chance that a user will click on a corresponding unpaid listing, and estimating a reclaimed ad spend as the difference between the actual revenue reported for a period of time and an estimate of the expected ad spend for a comparable period of time when de-cannibalizing actions were taken; and reporting the estimate of the reclaimed ad spend.

18 Claims, 5 Drawing Sheets

(56) References Cited

U.S. PATENT DOCUMENTS

| | | | |
|---|---|---|---|
| 2011/0270672 A1* | 11/2011 | Hillard | G06Q 30/0246 705/14.42 |
| 2012/0047120 A1* | 2/2012 | Connolly | G06F 16/958 707/706 |
| 2012/0166413 A1* | 6/2012 | LeBaron | G06Q 30/0246 707/E17.014 |
| 2012/0254149 A1* | 10/2012 | Ramsay | G06Q 30/0256 707/E17.108 |
| 2013/0013408 A1* | 1/2013 | Hjelm | G06F 16/9535 707/706 |
| 2013/0080247 A1* | 3/2013 | Parsana | G06Q 30/0241 705/14.46 |
| 2013/0173574 A1* | 7/2013 | Park | G06Q 30/0256 707/706 |
| 2016/0110766 A1* | 4/2016 | Katti | G06Q 30/0256 705/14.54 |
| 2017/0262899 A1* | 9/2017 | Geraghty | G06Q 30/0275 |
| 2018/0096067 A1* | 4/2018 | Tober | G06Q 30/0203 |
| 2018/0121430 A1* | 5/2018 | Kagoshima | G06F 16/951 |
| 2019/0286682 A1* | 9/2019 | Dzumla | G06F 16/9538 |
| 2019/0370853 A1* | 12/2019 | Vierra | G06Q 30/0275 |

OTHER PUBLICATIONS

Deeply Supervised Semantic Model for Click-Through Rate Prediction in Sponsored Search (Year: 2018).*

3 Ways You're Cannibalizing Your Traffic and Budget (and How to Stop) (Year: 2018).*

What Users See—Structures in Search Engine Results Pages (Year: 2009).*

The Design and Implementation of A Search Engine Marketing Management System (SEMMS) Based on Service-Oriented Architecture Platform (Year: 2007).*

Development of Display Ads Retrieval System to Match Publisher's Contents (Year: 2013).*

Running and Chasing—The Competition between Paid Search Marketing and Search Engine Optimization (Year: 2014).*

* cited by examiner

Search engine results page (SERP) 200

215 — surebuy grocery

Q All  ◊ Maps  ◊ Shopping  ▪ News  ▪ Images  ⋮ More          Settings

About 21,600,000 results (0.71 seconds)

Ad · www.surebuy.com/ ▼

210 — Surebuy Grocery - Shop In-Store or Online
Shop Surebuy Weekly Ad, just for U Digital Coupons And Earn Fuel Rewards. Start Saving!
Shop Quickly With In-Store, Delivery or Drive Up & Go™ Grocery Pick Up at Surebuy. Grocery
Pickup Available. just for U®. Earn Grocery Rewards. Personalized Deals.
117 Morrissey Blvd, Santa Cruz, CA - (831) 426-7489 - Hours & services may vary Surebuy Weekly Savings        Grocery Pickup
    Visit Surebuy Circular Online for     Contact-Free Order Pickup
    This Week's Specials & Promotions.   w/ Surebuy DriveUp & Go™ www.surebuy.com ▼

220 — Surebuy: Home - Online Grocery Delivery
Shop our wide selection of fresh, local organic meat & produce, popular wines & gluten-free
foods. Save even more with Just4U rewards and coupons.

Find a Location             Grocery Pickup
    Search Surebuy locations for     Unsupported browser. You're
    pharmacies, weekly deals on ...   currently using an older version ...

Weekly Ads                Surebuy Morrissey Blvd
    Find the latest weekly ads for     Visit your local Surebuy at 117
    Surebuy. Save with the latest ...   Morrissey Blvd in Santa Cruz ...

Surebuy Mission St          Surebuy Locations
    Ensuring our Neighbors' needs are  California - Washington - Arizona -
    met, we've set aside store hours ...  Colorado - Maryland - Virginia More results from surebuy.com »

*FIG. 2*

MANAGEMENT OF CANNIBALISTIC ADS TO REDUCE INTERNET ADVERTISING SPENDING

CROSS REFERENCE TO RELATED APPLICATIONS

This patent application is related to co-pending U.S. patent application Ser. No. 16/922,593 filed on Jul. 7, 2020, which is hereby incorporated in its entirety.

FIELD OF THE INVENTION

The present invention relates to online advertising technology, specifically to the ability to identify and manage the purchase of cannibalistic ads.

BACKGROUND OF THE INVENTION

An Internet search engine returns one or more web pages to a user's browser in response to a keyword search performed by the user. The returned web pages, known as "search engine results pages" or SERPs, include unpaid search listings, commonly referred to as "organic" search results, as well as paid advertisements, also referred to as ads. Each listing includes a URL, or link to a worldwide web page, that is relevant to a search term entered by the user. The web page that corresponds to a URL returned in a paid ad or unpaid listing in a SERP is often referred to as a landing page.

The goal of online advertising is to stimulate users to click on paid ads and visit an advertiser's website. The effectiveness of an online advertising campaign is typically measured as a function of the number of clicks on the paid listings, which equates to the number of visitors to the website due to the advertising campaign, and the amount of revenue generated by those visitors. The effectiveness of the advertising campaign can be measured by the ratio of revenue generated to the advertising expenditure, or also by the ratio of visitors to advertising expenditure.

However, the effectiveness of an ad campaign can be severely limited by cannibalistic ads, which are ads that introduce additional costs by diverting visitors to paid ads who would otherwise visit as a consequence of clicking on unpaid listings. In other words, cannibalistic ads increase an advertiser's costs by diverting visitors to cannibalistic ads from unpaid listings.

In its most basic form, a cannibalistic ad is an ad purchased by an advertiser that appears on a web page immediately next to an unpaid listing that promotes the same service or product as the paid ad. A user will sometimes click on the paid ad rather than the unpaid listing. In other cases, there may be one or more ads between the advertiser's ad and the corresponding unpaid listing.

Because cannibalistic ad spend is a new metric for determining the efficiency of ad campaigns, in addition to detecting cannibalistic ads it is desirable to determine the amount of money an advertiser spends purchasing cannibalistic ads. Such a value would enable an advertiser to determine the magnitude of the problem and to reduce their spending on cannibalistic ads without sacrificing the effectiveness of their ad campaign.

SUMMARY OF THE DESCRIPTION

A method, system, and a device for measuring the amount of money spent by an advertiser purchasing cannibalistic advertisements (ads) as well as the amount of money that can be reclaimed by not purchasing cannibalistic ads, referred to as reclaimed ad spend.

In certain embodiments, the method computes a cannibalism score for ads in search engine results pages (SERPs). In certain embodiments, the cannibalism score estimates the likelihood that a paid ad is cannibalistic, i.e. that it appears in proximity to a corresponding unpaid listing. In other embodiments, the cannibalism score estimates the reduction in revenue to the advertiser due to a paid cannibalistic ad appearing in the same SERP as a corresponding unpaid listing.

Certain embodiments are directed towards generating an estimate of reclaimed ad spend for an Internet advertising campaign, by receiving a set of keywords, where each keyword corresponds to a paid ad that is supplied to a search engine, gathering a cannibalism score for each paid ad, where a cannibalism score indicates that the presence of a designated paid ad in a SERP reduces the chance that a user will click on a corresponding unpaid listing, and estimating a reclaimed ad spend as the difference between the actual revenue reported for a period of time and an estimate of the expected ad spend for a comparable period of time when de-cannibalizing actions were taken; and reporting the estimate of the reclaimed ad spend.

Embodiments are directed to a computer-implemented method for estimating the efficiency of an Internet advertising campaign, including receiving a plurality of keywords, where each keyword corresponds to a paid ad that is supplied to a search engine, where a paid ad includes a link to a web page, and where in response to receiving a keyword from a web browser the search engine returns a search engine results page (SERP) that includes (1) the corresponding paid advertisement, and (2) at least one unpaid listing, wherein an unpaid listing includes a link to a web page, and where a web page is within a domain, gathering (1) a cannibalism score for a designated paid ad, where a cannibalism score indicates that the presence of a designated paid ad in a SERP reduces the chance that a user will click on a corresponding unpaid listing, wherein a corresponding unpaid listing has a linked web page in the same domain as the linked web page of the designated paid ad, and (2) an actual revenue due to clicks on the designated paid ad and on any corresponding unpaid listings in SERP for a time period where no de-cannibalizing actions were taken, where a de-cannibalizing action occurs when a paid ad is not supplied to the search engine due to its cannibalism score, estimating a reclaimed ad spend for the designated paid ad as the difference between an estimate of the expected cost of purchasing the designated ad for a period of time and the actual cost reported for a comparable period of time during which de-cannibalizing actions were taken, and reporting the estimate of the reclaimed ad spend.

BRIEF DESCRIPTION OF THE DRAWINGS

The subject invention will be more fully understood and appreciated from the following detailed description, taken in conjunction with the drawings in which:

FIG. 2 is an example of a cannibalistic ad;

Figure 1:
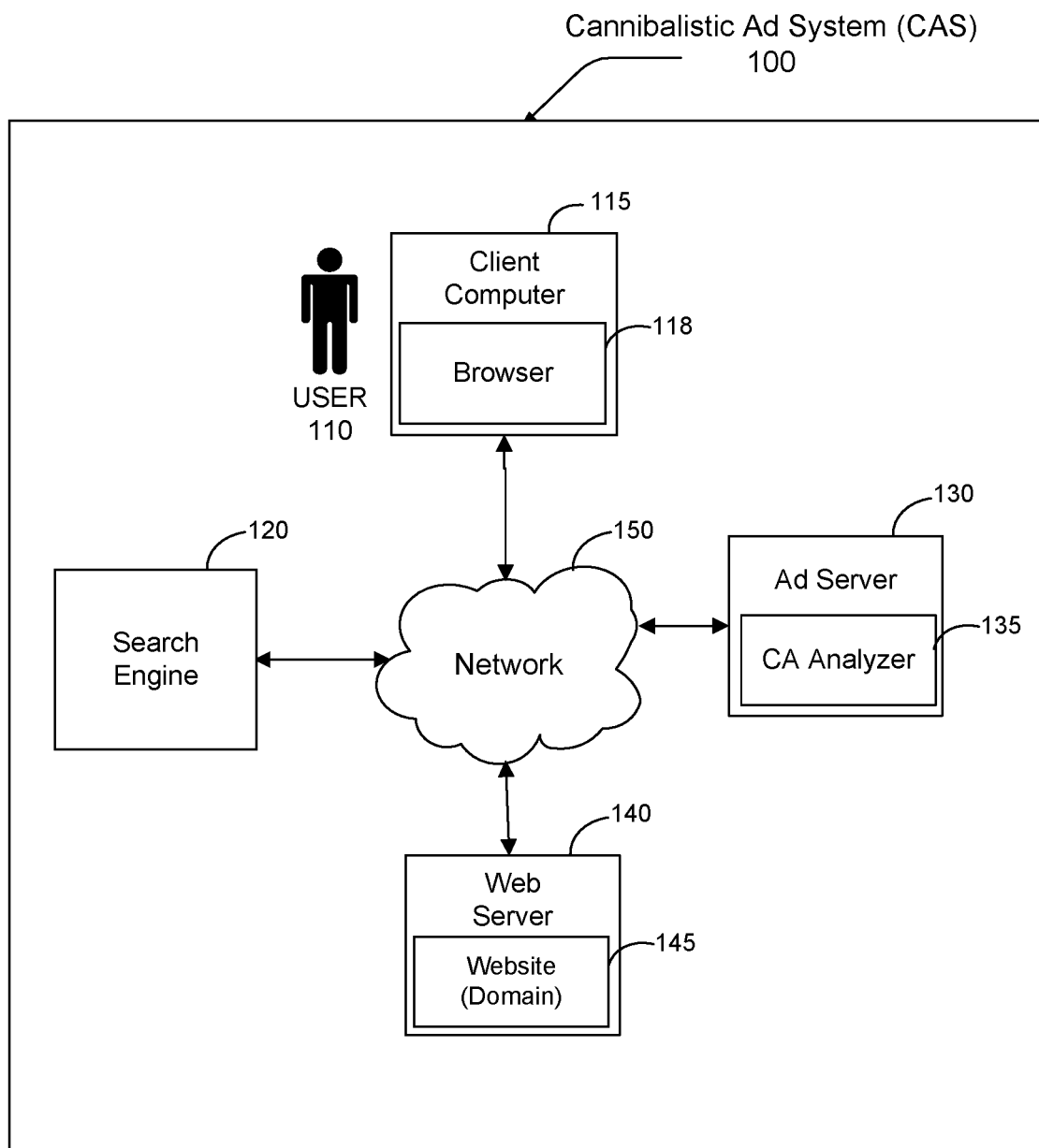
FIG. 1 is a simplified block diagram of a cannibalistic ad system (CAS) that automatically identifies cannibalistic ads and calculates the potential improvement that may be achieved by not purchasing such ads.

The figures depict embodiments of the present invention for purposes of illustration only. One skilled in the art will readily recognize from the following discussion that alternative embodiments of the structures and methods illustrated herein, as well as combinations of embodiments, may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

User—means an individual that uses a mobile device, PC or other electronic device to access services provided by the present invention across a network.

Advertiser—refers to an individual, company or other organization that places an online ad, or causes an online ad to be placed, via a search engine for a good or service that they are advertising, selling, or promoting.

Keyword or search term—refers to a word, words, phrase or sentence entered by a user into a search field in a web page, also referred to as a keyword query, which is then transmitted to a search engine that performs the requested search and returns results. An advertiser may purchase, or bid on, an ad that corresponds to a keyword; in that case, the SERP returned by the search engine in response to the user entering the keyword includes a paid ad, placed by the advertiser, that corresponds to the keyword.

Search engine or Web search engine—means a computer server, or Internet service that receives a keyword, typically as a result of a keyword query, uses the keywords to search for web pages that correspond to the keywords and returns one or more search engine results pages (SERPs) that include paid ads, and unpaid, or organic, listings.

Listing—is a result from a keyword search that appears in a SERP. Each listing includes a link to a corresponding web page. A listing can be a paid ad, i.e. a paid listing, or an unpaid, or organic, listing, that is generated by a search engine. Listings in a SERP are ranked; each listing has a numerical position starting from the top, or first, or highest, position. Unless otherwise specified, a listing position in a SERP refers to the numerical position of a listing from the top in the unpaid search results. Thus, first position is the highest position, second is the next highest position, etc. Paid listings have a paid listing position and unpaid listings have an unpaid listing position.

Search Engine Results Page (SERP)—means a list of web pages returned by a search engine in response to a keyword query. Each element in the list, i.e. each listing, typically includes a title, a URL or link to the web page, and a short description showing where the keywords have matched content within the page. A SERP may refer to a single web page that includes a sequence of paid and unpaid listings, or to the set of all links returned for a search query possibly spanning multiple web pages.

Landing page—means a web page whose URL corresponds to a listing in a SERP. When a user clicks on a listing in a SERP the web browser requests and displays the corresponding landing page.

Cannibalistic ad—refers to a paid ad provided by a search engine in a web page in response to a search by a user that diverts clicks from a nearby unpaid listing. Generally, a cannibalistic ad has a reduced value when it appears adjacent to or in close proximity to a corresponding unpaid listing, as compared to the case where the cannibalistic ad appears in a SERP and there is no corresponding unpaid listing. In this context, value is typically measured in terms of visitors, revenue from sales of the advertised product or a similar metric. Further, a corresponding unpaid listing is an unpaid listing that refers to the same good or service advertised by the paid ad. As discussed hereinbelow, the links in a paid ad and unpaid listing may refer to the same landing page or to different landing pages.

Generalized Operation

The operation of certain aspects of the invention is described below with respect to FIGS. 1-4.

FIG. 1 is a simplified block diagram of a cannibalistic ad system (CAS) 100 that automatically identifies cannibalistic ads and calculates the potential improvement that may be achieved by not purchasing such ads.

A user 110 uses a web browser such as GOOGLE CHROME or Mozilla Firefox, or other client application, referred to herein as browser 118, to visit a website that enables him/her to perform a keyword search. Browser 118 transmits the keyword to a search engine 120 that performs the requested search and returns a (SERP) which is then displayed by browser 118. The SERP typically includes one or more paid listings, or ads, and one or more unpaid listings. Each ad or unpaid listing corresponds to a web page, also referred to as a landing page, that is determined by search engine 120 to match the keyword. In the case of paid ads, an advertiser "purchases" the keyword and provide a corresponding ad to an ad server 130 which communicates with search engine 120. Thus, when user 110 enters the keyword into a search box the search engine includes the corresponding paid ad in the SERP it returns to browser 118.

The landing page belongs to a domain or a website 145 that is hosted by a web server or web service, referred to simply as web server 140. Web server 140 may host a plurality of domains. The web page may be static, i.e. existing as computer file in HTML format or another format or it may be dynamically generated. Further, web server 140 may provide e-commerce, enabling user 110 to purchase items, or otherwise perform transactions that generate revenue from website 145.

Ad server 130 provides paid ads to search engine 120 to be included in SERPS. A cannibalistic ad (CA) analyzer 135 analyzes SERPS and identifies cannibalistic ads. Generally, CA analyzer 135 generates a list of keywords which when purchased may result in cannibalistic ads being placed. The operation of CA analyzer 135 is described in greater detail with reference to FIGS. 2-4 hereinbelow.

It may be appreciated, that CA analyzer 135 may operate in a different server or computer system than ad server 130. Further, ad server 130 may be implemented as more than one physical server computer or by a cloud service such as AMAZON AWS. Further, CA analyzer 135 may be implemented as more than one physical server computer or by a cloud service such as AMAZON AWS.

Network 150 enables the various computers, servers, and services identified in CAS 100 to exchange data. Network 150 typically refers to the public Internet but may also refer to a private network or any combination of private and public networks.

FIG. 2 is an example of a search engine results page (SERP) 200 that includes a cannibalistic ad. In response to user 110 entering the search term 215 "surebuy grocery" into browser 118 search engine 120 returns SERP 200. SERP 200 includes a paid listing 210 and an unpaid listing 220, which is an ad for a grocery store, or chain of grocery stores, named "Surebuy Grocery".

Listing 210 is the first and only paid ad included in SERP 200. Listing 220 is an unpaid ad 220. Unpaid ad 220 is in the first unpaid listing position in SERP 200.

Ad 210 is a cannibalistic ad because it is immediately above unpaid listing 220. If ad 210 did not appear above unpaid listing 220 than a larger percentage of users would click on unpaid listing 220. Thus, an advertiser paid for ad 210 even for the cases where a user would have otherwise clicked on unpaid listing 220 had ad 210 not been present in SERP 200. Thus, placement of ad 210 in the position immediately above unpaid listing 220 increased the cost of advertising commensurately.

Cases Of Cannibalistic Ads

The case of FIG. 2, in which an unpaid listing appears immediately below a paid ad for the same product or service and where the paid ad is in the first position is considered the primary case of a cannibalistic ad. In this case there is only one paid ad, the cannibalistic ad. However, there are other cases in which an advertiser may deem an ad to be cannibalistic.

Several factors may be considered in determining whether a paid ad is cannibalistic. These include (1) position, (2) distance, (3) rate or frequency of appearance, (4) whether the landing page is the same or different, and (5) whether it is a "friendly" ad or a "competitive" ad (or neither), and (6) the incremental or net revenue that accrues from an ad placed by an advertiser as compared to the revenue that accrues due to the organic search results. Factors 1-5 are discussed first and a rule-based approach to evaluating whether an ad is cannibalistic based on these factors is presented.

Position refers to the position in the search results of a paid ad or of a corresponding unpaid listing. As mentioned, the primary case is where the paid ad and the unpaid listing are each in first position, i.e. the paid ad is in the first position among the paid ads and the unpaid listing is in the first position among the unpaid listings. However, a paid ad in the $2^{nd}$ or $3^{rd}$ position and the unpaid listing in $1^{st}$ position, may, in some cases, be considered cannibalistic.

Distance refers to the number of listings, paid and unpaid, between the paid ad and the unpaid listing. Distance may be determined from the position of the paid ad, the total number of paid ads, and the position of the unpaid listing as follows:

$$\text{Distance} = (\text{\# PAs} - \text{position PA}) + \text{position UL} \quad \text{Equation 1}$$

where # PAs is the number of paid ads, position PA is the position of the paid ad being analyzed among all the paid ads, and position UL is the position of a corresponding unpaid listing among the unpaid listings. In this embodiment, it is understood that the paid ads appear sequentially above the unpaid listings. However, a similar measure of distance can be formulated if paid ads appear to the side of or in another geometric location on web pages.

Rate or frequency of appearance refers to the fact that the position of ads and unpaid listings may change from search-to-search. Thus, in some embodiments, a search term may be "sampled" over a period of time or over a number of repetitions in order to determine an average position of a paid ad or of an unpaid listing in a SERP that is provided in response to receiving a specific keyword. For example, a search may be repeated once a minute or once an hour for a day or a week to obtain positions of a paid ad or an unpaid listing in the received SERPs. Alternatively, a search may be repeated 100 times during a day. Of course, other sampling methods may also be used.

In some cases, the landing page of a cannibalistic ad is different than the landing page of its corresponding unpaid listing. In some cases, such an ad is considered cannibalistic; in other cases an advertiser may be testing a landing page, or simply prefer to have a user see their ad rather than an unpaid listing that is generated by a search engine.

"Friendly" Ads and "Competitive" Ads

An ad may be categorized as a "friendly" ad or as a "competitive" ad with respect to a specific ad placed by an advertiser. The category assigned to an ad can then be used as part of a determination as to whether the advertiser's ad is cannibalistic.

Example 1: In a first example, if a first company is a business partner with a second company, then it may treat ads by the second company as "friendly" and agree to not advertise competitively with ads placed by the second company. Thus, in this example, a friendly ad in any position among the paid ads implies that the advertiser's own ad is cannibalistic. Several other examples are given below.

Example 2: an auto dealer B sells autos manufactured by auto manufacturer A. Manufacturer A may consider that ads by dealer B for products from manufacturer A are friendly and decide not to advertise when ads by dealer B appear.

Example 3: alternatively, manufacturer A considers that ads placed by dealer B for their products (i.e. products from manufacturer A) are competitive and may want to advertise directly against those ads, i.e. advertise when it is statistically likely that an ad placed by dealer B will appear in a SERP.

Example 4: an Advertiser considers an ad cannibalistic if there are no competitive ads regardless of the position of a corresponding unpaid listing.

More generally, an advertiser may consider an ad placed by a specific company or organization to be friendly or competitive and can implement ad rules based on such a determination.

Further, an advertiser, by scraping and then analyzing SERPS. can easily determine the domain of landing pages for ads in a SERP. Thus, a friendly ad can be considered as an ad with a landing page in a friendly domain and a competitive ad can be considered as an ad with a landing page in a competitive domain. Thus, in certain embodiments, friendly and competitive ads can be determined based on a list of friendly domains and a list of competitive domains. In other embodiments, company and organization names or even product names may be used to determine whether an ad is friendly or competitive.

Thus, from the perspective of an advertiser, each ad in a SERP can be categorized as: 1) their own ad, 2) a friendly ad, 3) a competitive ad, and 4) other, i.e. an ad from a company, organization or domain that is not the advertiser itself, not friendly and not competitive.

In certain embodiments, CA analyzer 135 only analyzes the first SERP returned by a search on a search term. Typically, there is a maximum number of paid ads in a SERP; for example, the GOOGLE search engine returns a maximum of four ads on a SERP. Thus, the most frequently returned ad for each ad position can be determined. In the following discussion, it is assumed that the most frequently returned ad for each SERP position is determined by CA analyzer 135 and the category of the ad is similarly determined.

In other embodiments, each ad can be categorized or classified in a more general way, i.e. an arbitrary number of categories, other than friendly and competitive can be used.

Rules For Determining Cannibalistic Ads

A paid ad can be evaluated using a rule that evaluates a cannibalistic score or measure. A rule may be formulated based on the previously discussed factors, namely: (1) the categories assigned to paid ads in a SERP (2) the number of paid ads in a SERP, (3) the average distance between the advertiser's ad to its corresponding unpaid listing, and (4) the average position of the corresponding unpaid listing.

Table 1 gives an example of an approach for formulating rules that can be used to evaluate whether an ad is cannibalistic using the previously described factors of ad position, ad category, distance, and position of the corresponding unpaid listing.

In Table 1, each row represents one rule and the columns are as follows: A. the # of the rule, B. is the category of ad that appears in the $1^{st}$ position ad on the first SERP, C. is the category of the ad that appears in the $2^{nd}$ position ad on the first SERP, D. is the average position of the corresponding unpaid listing for an ad placed by an advertiser, E. is the average distance between the advertiser's ad and its corresponding unpaid listing, F. denotes whether if the rule is satisfied the advertiser's ad is considered cannibalistic (Yes) or not (No), and column G. gives a brief narrative description of the rule. Further, in this example, the categories that may be assigned to an ad are A-advertiser, F-Friendly, C-competitive, and O-other.

It may be appreciated that in the example of Table 1, columns D and E are shown as having integer values, whereas in certain embodiments they may be real numbers or decimal numbers based on the sampling values obtained for D-average position of the corresponding unpaid listing, and E-the average distance from the advertiser's ad to the corresponding unpaid listing. Further, columns B, C and F may alternatively have percentage, decimal or fractional values. For example, in column B the category value of the first position listing may be A (0.75), F (0.1), C (0.1) and O (0.05), indicating the rate or percentage of the time the first position ad is category A, F, C, or O.

It may further be appreciated that while in certain embodiments a friendly ad is considered to be an ad whose landing page is in a domain that is considered friendly, in other embodiments there may be specific rules for specific domains. For example, rule 5 is evaluated based on whether an ad with a link to a specified domain (Dom A) appears in either the $1^{st}$ or second paid ad position and if the corresponding unpaid ad is at a distance of less than 3 from the advertiser's ad.

Finally, if more than one rule is applied to an ad then a cannibalism score represents a total, an average value or a weighted average value of the results of all rules applied to the ad. For example, if one rule evaluates to 75% and another rule to 25% then in the simplest case an average value of 50% is the cannibalism score for the ad.

Rules Based on Incremental Ad Value

There may be a difference between the revenue that accrues to an advertiser from an ad and from a corresponding unpaid listing. This may occur if the ad and the unpaid listing each link to a different landing page since the different landing pages may have different levels of effectiveness. Thus, if an ad performs worse on average than a corresponding unpaid listing then, on average ad clicks, reduce revenue by cannibalizing clicks on the unpaid listings. Using data sources provided by a search engine, such as GOOGLE ANALYTICS, GOOGLE ADWORDS, and GOOGLE SEARCH CONSOLE, described in greater detail in Table 2 hereinbelow, it is possible to determine an average value, or revenue, due to ad clicks and an average value, or revenue, due to clicks on a corresponding unpaid listing. The average value of a click refers to the revenue expected per click or visit, i.e. average revenue, by a visitor to the linked landing page.

One rule that can be defined by an advertiser, is based on the incremental, or comparative value, of ad clicks versus unpaid listing clicks as defined in Equation 2 below:

$$[(\text{Value of Ad Click} - \text{Value of Unpaid Click})]/\text{Cost of Ad Click} \quad \text{Equation 2}$$

Here if incremental value, as defined by Equation 2, is greater than one then there is a net positive revenue from purchasing an ad after taking into account the cost to purchase the ad. Thus, a simple rule based on Equation 2 is that an ad is cannibalistic if the incremental value is less than one. But other rules may be also considered, and rules based on incremental value (Equation 2) can be mixed with rules such as those illustrated in Table 1. Further, other formulas for defining incremental value may be defined without departing from the scope of the present invention.

Figure 3:
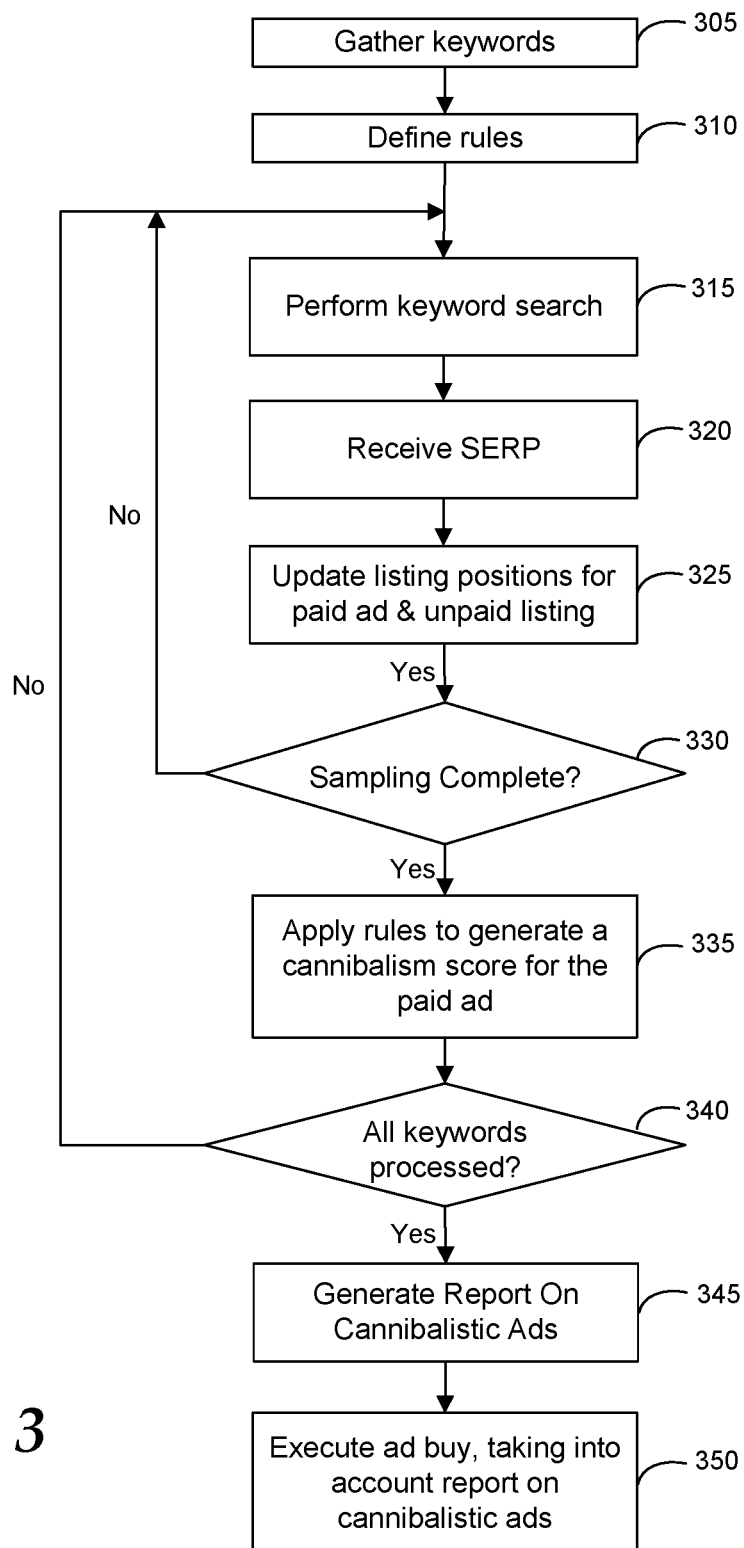
FIG. 3 is a simplified flowchart of an overall method for identifying cannibalistic ads.

It will be understood that each block of the flowchart illustrated in FIG. 3, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps that implement the actions specified in the flowchart block or blocks to be performed by the processor to produce a computer-implemented process or method. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

FIG. 3 provides an overall method 300 for identifying cannibalistic ads and generating a cannibalism score for ads. The objective of method 300 is to evaluate search engine ads that are being purchased by an advertiser to determine which are cannibalistic.

At step 305, CA analyzer 135 gathers a set of search terms to evaluate. These may be ads that are currently being purchased by an advertiser, or prospective ads. Generally, each ad corresponds to a search term, or keyword. This step may be performed in various ways. For example, if a search engine marketing (SEM) program of a particular advertiser, e.g. Surebuy (see FIG. 2), is being evaluated, the advertiser can provide a list of search terms they typically purchase and the corresponding paid ads that appear in resulting SERPS.

Alternatively, a search engine can provide a set of keywords. For example, the GOOGLE SEARCH CONSOLE, provided by GOOGLE, INC., can provide a listing of search terms and the average search position of an ad that is placed relative to each search term. Thus, for example, if only the case of paid ads appearing in the first and second position and unpaid listings in the first or second position is of interest, then only search terms with an average position less than 2 may be evaluated.

Additional data can be obtained from search engines. For example, GOOGLE ADWORDS, provided by GOOGLE, INC. provides information including ad position, ad cost, click through rate, ad impression share and similar metrics.

At step 310 rules for evaluating and scoring ads are generated. These rules may be similar to those given in Table 1 or in equation 2.

At step 315 a keyword search is performed against a search engine for one of the gathered search terms.

At step 320 a SERP is received from the search engine. Note that while method 300 applies to a single search engine, it can be performed for additional search engines of interest. Thus, method 300 applies equally to all search engines.

At step 325 the listings in the received SERP (paid and unpaid) are analyzed to determine the listing position of a paid ad by the advertiser and the listing position of a corresponding unpaid listing, if any. In certain embodiments, the search is performed repeatedly, i.e, a sampling is performed to obtain an average listing position. In this case, at this step the average listing positions for the paid ad and the corresponding unpaid listing are updated.

At step 330, if sampling of the average listing positions is being performed, then a determination is made as to whether more samplings need to be performed. If so, then processing returns to step 315; if not, then processing flows to step 335.

At step 335 the rules formulated at step 310 are applied, resulting in a cannibalism score for the paid ad. A cannibalism score can have a variety of meanings. For example, in certain embodiments, the cannibalism score estimates a percentage or amount of sales or revenue lost due to the proximity of the paid ad to the corresponding listing within a SERP.

In other embodiments, the cannibalism score represents the chance that an ad actually is cannibalistic and is going to reduce revenue that would be generated by an unpaid listing. In such embodiments, a cannibalism score of 75 indicates that there is a 75% chance that an ad is cannibalistic.

In other embodiments, the score may be a Boolean (True, False) value that simply indicates that an ad is deemed to be cannibalistic.

At step 340, if not all keywords have been processed then processing returns to step 315. If all keywords have been processed, then processing continues at step 345.

At step 345, a report is generated that a cannibalism score for each keyword-paid ad combination. Such a report may encompass all gathered keywords or only those determined to be cannibalistic. For example, only keyword-paid ad combinations that have a score higher than a given threshold value may be included in the report. In some cases, the method ends at this step and the report is provided to the advertiser or to a service company they designate, such as an online advertising company.

In other embodiments, at step 350 the advertiser or their web service company may modify their search engine advertising ad buy based on the report generated at step 345.

Measure of Efficiency: Reclaimed Ad Spending

The concept of cannibalistic ads and improving the efficiency of ad campaigns by automatically analyzing whether paid ads are likely to be cannibalistic is novel. However, this mechanism can significantly reduce the cost of and improve the efficiency of an ad campaign. Thus, it is important to be able to measure the reduced cost and increased efficiency by not purchasing cannibalistic ads. Such measures of efficiency can be provided to advertisers to validate the effectiveness of employing automated methods to identify cannibalistic ads and to take appropriate actions, referred to as de-cannibalizing actions.

Figure 4:
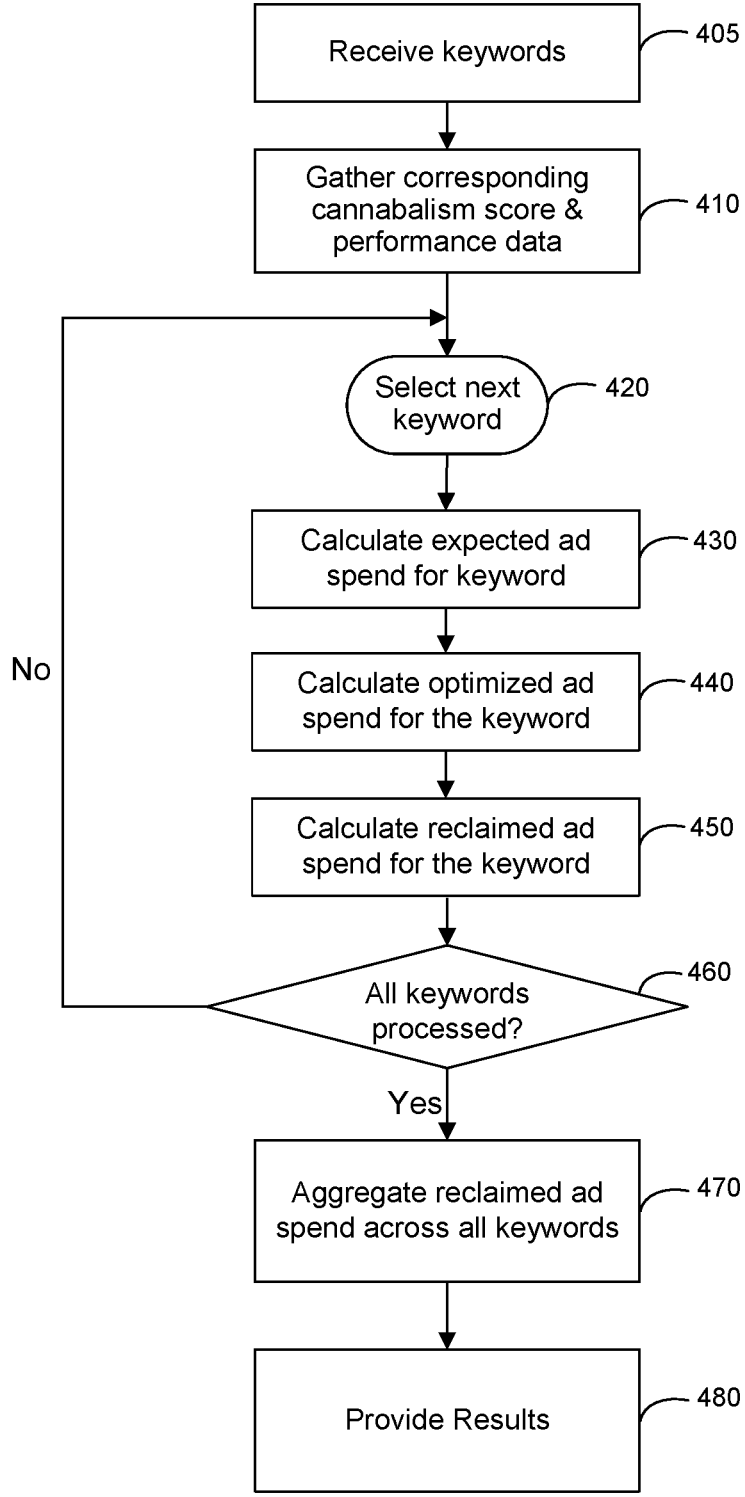
FIG. 4 is an overall method for determining a measure of efficiency for an ad campaign based on an estimate of potential savings due to reduction in spending on cannibalistic ads.

FIG. 4 provides an overall method 400 for determining a measure of efficiency for an ad campaign based on an estimate of potential savings due to not purchasing some or all of the cannibalistic ads identified by method 300. Method 400 calculates a measure, referred to herein as a "reclaimed ad spend", that estimates the savings due to not purchasing one or more paid ads that have been determined to be cannibalistic. Method 400 uses the cannibalism scores determined by method 300 to determine whether to purchase individual ads or to refrain from purchasing it.

In certain embodiments, method 400 calculates reclaimed ad spend (RAS) for a set of keywords for a single day (or another suitable time period) where reclaimed ad spend for a search term for one day may be defined as in Equation 3, below:

RAS=Expected ad spend−optimized ad spend     Equation 3

At step 430 expected ad spend (EAS) for a day may be computed as:

EAS=Average ad cost-per-click (CPC) for the day     Equation 4

Average ad click through rate (CTR) for the day

Search term impressions for the day (i.e. the number of times a user searched for the keyword)

It is understood that the time period of one day is used in certain embodiments while other time periods may be used in other embodiments of the subject invention.

Optimized ad spend (OAS) is the actual measured ad spend, or cost, typically reported by the search engine, for a period of time when de-cannibalizing actions are being take, i.e. a period when cannibalization method 300 is operating and decisions about whether to purchase a keyword in order to run a paid ad is based, at least in part, on a cannibalization score for the keyword. The operation of method 300 including the decision not to purchase cannibalistic ads is also referred to as taking de-cannibalizing actions. An example de-cannibalizing action would be to not purchase a paid ad whose cannibalism score is above a threshold value.

As an example, if method 400 is performed for ads purchased from the GOOGLE search engine then measure ad cost is obtained from a service named GOOGLE ADS that is provided by GOOGLE.

As an example of expected ad spend (Equation 4) for one search term for one day: if CPC is $1, CTR is 10%, and the number of impressions expected for the day is 2,000, then the Expected ad spend (EAS) for the day=$1*0.1*2,000=$200.

Thus, if the optimized, actual, ad spend, as reported by the search engine is $50 then the reclaimed ad spend is $200–$50=$150.

In certain embodiments, method 400 only operates with a single search engine, e.g. the GOOGLE search engine. In such embodiments, method 400 may operate using the data presented in Table 2, below. In other embodiments, comparable data is obtained from other search engines or from search engines in addition to a single, principle, search engine. Results may then be aggregated across multiple search engines.

TABLE 2

Data sources and inputs

| Data Source | Specific input |
| --- | --- |
| Google Ads API | Provides metrics for a keyword including impressions, clicks, average click through rate (CTR), ad cost per click (CPC). |
| Google Search Console API | Provides search traffic data for a keyword over a specified time period, including organic clicks, organic impressions, landing page URL. |
| Google Analytics API | Provides revenue and traffic source for a date. |
| De-cannibalization system (i.e. results from method 300) | Provides a cannibalization score for a paid ad for a date or time period. |

Some of the terms used in Table 2 are defined as:

Traffic source refers to how the visitor arrived at the site, e.g. by clicking on a paid ad by clicking on an organic listing.

Ad clicks refers to the number of times users clicked on the ad, which corresponds to the search term being evaluated, as displayed in a SERP returned as a result of a keyword search using the Google search engine.

Ad cost: Dollars spent by the advertiser for ads for paid ads that appeared in SERPS.

Organic clicks refer to the number of times users clicked on unpaid, "organic", Google Search result listings Organic impressions refer to the number of times an unpaid listing appears on a SERP in response to Google Searches performed by users.

Baseline period refers to a period of time when no de-cannibalizing actions are taken on a search term, i.e. purchase decisions do not take into account the cannibalization score for a search term. A baseline period is typically measured in days. These may be a number of days within a larger time interval, e.g. 4 out of the last 8 days, or number of consecutive days.

Baseline data refers to data captured during a baseline period.

Additional Measures of Efficiency

In addition to reclaimed ad spend, the efficiency of reducing spending on cannibalistic ads can be shown using additional or alternative measures. Each of the following measures can be compared between a time period when no de-cannibalizing actions are taken and a time period of similar duration when de-cannibalizing actions are performed: ad clicks, ad cost, organic clicks, impressions, and revenue. The data can be aggregated across all search terms and across different time intervals (day, week, month, etc.).

Returning to method 400, at step 405 keywords to be evaluated are received or gathered. Next, at step 410 corresponding cannibalism scores, generated by method 300, and performance data, as discussed above in Table 2, are gathered for each received keyword.

At step 420 a keyword is selected for processing. At step 430 expected ad spend for the keyword is calculated according to Equation 4. Then, at step 440 optimized ad spend is retrieved from the data gathered at step 410. As previously mentioned, optimized ad spend is typically gathered from a search engine.

At step 450 reclaimed ad spend is calculated according to Equation 3. Also, at step 450 other measures may be calculated, as discussed above, including inter alia ad clicks, ad cost, organic clicks, impressions, and revenue. As a basis of comparison, these measures may be calculated or gathered for comparable length time periods when de-cannibalizing actions were taken and when they were not taken.

At step 460 a determination is made as to whether all keywords have been processed. If not, then processing returns to step 420, if so, then processing flows to step 470.

At step 470, optionally, results, including reclaimed ad spend, are aggregated across all keywords and potentially across multiple time intervals.

At step 480, results are provided to a customer or client. This may be in the form of inter alia a file such as a MICROSOFT EXCEL table, or may be provided as a presentation. Additionally, such data may constitute an intermediate result and may be further analyzed and used for purposes of reporting or decision-making.

Figure 5:
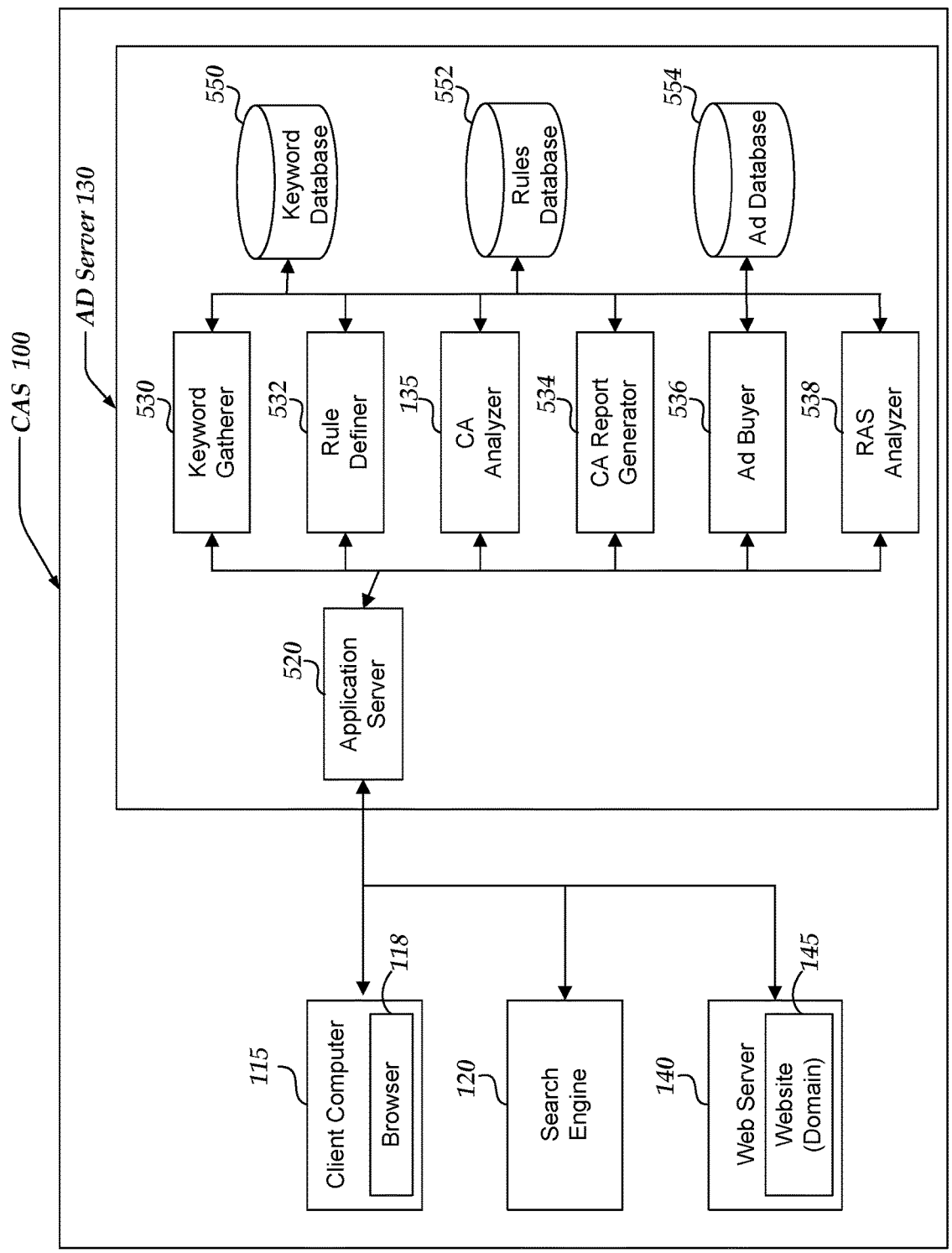
FIG. 5 is a block diagram that depicts the software modules included in the cannibalistic ad system.

FIG. 5 is a block diagram that depicts the software modules of cannibalistic ad system (CAS) 100. FIG. 5 describes the relevant software elements of CAS 100, including client computer 115, search engine 120, web server 140 and ad server 130.

Client computer 115 interacts with user 110 and enables user 110 to perform web searches using a web browser 118.

Browser 118 is typically a standard, commercially available, browser such as MOZILLA FIREFOX or MICROSOFT INTERNET EXPLORER. Alternatively, it may also be a client application configured to receive and display graphics, text, multimedia, and the like, across a network.

Browser 118 issues HTTP requests to and receives HTTP responses Internet-connected computers such as search engine 120, web server 140 and client computer 115. Application server 420 receives the HTTP requests and invokes the appropriate ad server 130 software module to process the request. Application server 520 may be a commercially available application server that includes a web server that accepts and processes HTTP requests transmits HTTP responses back along with optional data contents, which may be web pages such as HTML documents and linked objects (images, or the like).

Application server 520 establishes and manages sessions with search engine 120 and web server 140. In addition, it may interact with client computer 115.

The software modules of search engine 120 are generally outside the scope of the present invention. However, as discussed hereinabove and detailed in Table 2, a search engine is expected to provide a variety of results data relative to ads that are purchased by an advertiser and which it provides in SERPs in response to searches. Web server 140 manages one or more websites 145 where each website includes one or more domains.

Ad server 130 includes a keyword gatherer 530, a rules definer 532, cannibalistic ad (CA) analyzer 135, a cannibalistic ad (CA) report generator 534, in certain embodiments, an ad buyer 536, a reclaimed ad analyzer, a keyword database 550, a rules database 552, and an ad database 554. It may be appreciated that each of the abovementioned databases may be implemented as one or more computer files spread across one or more physical storage mechanisms. In one embodiment, each of the abovementioned databases is implemented as one or more relational databases and is accessed using the structured query language (SQL).

Keyword gatherer 530 obtains keywords from search engine 120 and potentially from other sources. Keyword gatherer 530 may also obtain keywords from an advertiser, for example in computer files supplied by the advertiser. Keyword gatherer 530 stores keywords in keyword database 450. It performs the processing associated with step 305 of method 300.

Key word gatherer 530 additionally, gathers data from search engine 120 required by method 400 to compute reclaimed ad spend, including revenue due to a keyword, average cost-per-click (CPC), average click through rate (CTR) and impressions.

Rules definer 532 defines rules that determine a score for an ad in a SERP. It stores rules in rules database 552. Rules definer 532 implements step 310 of method 300. Rules definer 532 may be implemented in a variety of ways; for example in certain embodiments rules definer 532 simply receives a text file that defines the rules; while in other embodiments it provides a graphic interface to client computer 115 that allows a user to interactively define rules. Generally, the method for defining rules is outside the scope of the present invention.

CA analyzer 135 performs the processing associated with steps 315-340 of method 300. It uses gathered keywords stored in keyword database 550 to obtain SERPS and to determine the position of paid ads and corresponding listings and stores the results in keyword database 550. It further evaluates SERPS to generate a cannibalistic ad score and stores the results in ad database 554.

CA report generator 534 generates a report that provides the cannibalistic ad scores for ads. It performs step 345 of method 300.

In certain embodiments ad buyer 536 purchases ads from search engine 120 that take into account the results of the cannibalistic ad analysis as represented by cannibalistic ad report stored in ad database 554. Specifically, ad buyer 536 makes a decision on a case-by-case basis whether to purchase an ad based on its cannibalism score. In other embodiments, ad buyer 536 is not part of CAS 100. For example, the function of ad buyer 536 may be performed by a third party ad agency.

Reclaimed ad spend analyzer (RAS analyzer) 538 analyzes the results, i.e. efficiencies, obtained by not purchasing ads that are deemed cannibalistic. Generally, RAS analyzer 538 performs method 400 to generate a report or other result that can be provided to an advertiser. RAS analyzer 538 may also compute other measures of efficiency other than reclaimed ad spend, as previously discussed. Such measures include inter alia ad clicks, ad cost, organic clicks, impressions, revenue for comparable length time periods when de-cannibalizing actions were taken and not taken. RAS analyzer 538 stores its results in ad database 554.

Keyword database 550 stores gathered keywords. It also stores the positions or average positions of ads and corresponding unpaid listings, where the ads are placed by an advertiser or by ad server 130 or by another party acting on behalf of the advertiser and where the ads appear in SERPS returned as a result of keyword searches.

Rules database 552 stores rules that are used to generate a cannibalism score for ads.

Ad database 554 stores ads supplied by an advertiser that correspond to gathered keywords. Generally, each keyword of interest to an advertiser has a corresponding paid ad that may be placed with a search engine. Ad database 554 also stores CA reports generated by CA report generator 534 and reclaimed ad spend and other results data produced by RAS analyzer 538.

The above specification, examples, and data provide a complete description of the manufacture and use of the composition of the invention. Many embodiments of the invention can be made without departing from the spirit and scope of the invention.

TABLE 1

Example Rules for Determining if an Ad is Cannibalistic

| A. Rule # | B. Cat Ad 1 | C. Cat Ad 2 | D. Unpaid Position | E. Distance | F. Is Can? | G. Description of Rule |
|---|---|---|---|---|---|---|
| 1 | A | NA | 1 | 1 | Yes | (Cannibalistic) Classic case of cannibalistic ad. Advertiser's ad is in $1^{st}$ position and unpaid listing is typically in $1^{st}$ position. There is typically not a $2^{nd}$ position ad. |
| 2 | A | F | 1 | 2 | Yes | (Cannibalistic) Advertiser's Ad is in $1^{st}$ position; $2^{nd}$ position ad is a friendly ad; and unpaid lisitng is typically in $1^{st}$ position. |
| 3 | A | C | 1 | 2 | Yes | (Cannibalistic) Advertiser's ad is in $1^{st}$ position; $2^{nd}$ ad is competitive; unpaid listing is typically in $1^{st}$ position |
| 4 | A | C | 2 | 3 | No | (Not Cannibalistic) Advertiser's ad is in $1^{st}$ position; $2^{nd}$ ad is competitive; unpaid listing is in $2^{nd}$ position. |

TABLE 1-continued

Example Rules for Determining if an Ad is Cannibalistic

| A. Rule # | B. Cat Ad 1 | C. Cat Ad 2 | D. Unpaid Position | E. Distance | F. Is Can? | G. Description of Rule |
|---|---|---|---|---|---|---|
| 5 | Dom A | Dom A | NA | <3 | No | (Not Cannabalistic) An ad, not the advertiser's ad appears in either the $1^{st}$ or $2^{nd}$ paid ad position, and the advertiser's corresponding unpaid listing is a distance of less than 3 from the advertiser's ad, then. |

What is claimed is:

1. A computer-implemented method for estimating the efficiency of an Internet advertising campaign, comprising:

receiving a plurality of keywords, wherein each keyword corresponds to a paid ad that is supplied to a search engine, wherein a paid ad includes a link to a web page, wherein each web page is in a domain, and wherein in response to receiving a keyword from a web browser the search engine returns a corresponding search engine results page (SERP) that includes (1) at least one paid advertisement, and (2) at least one unpaid listing, wherein an unpaid listing includes a link to a web page, and wherein a paid ad has an ad position within a web page in relation to other paid ads wherein the first ad position is the most valuable position and larger ad position values are less valuable and an unpaid listing has an unpaid listing position within a web page in relation to other unpaid listings wherein the first unpaid listing position is the most valuable position and larger unpaid listing position values are less valuable;

determining an ad position for a designated paid ad and an unpaid listing position for each unpaid listing that corresponds to the designated unpaid ad, wherein a corresponding unpaid listing includes a link to the same domain as the link included in the designated paid ad, and wherein a position is an average position across multiple samples of the keyword that corresponds to the designated ad;

generating (1) a cannibalism score for the designated paid ad, wherein a nonzero cannibalism score indicates that the designated paid ad appears in a first ad position in a SERP, there is no paid ad in a second ad position, and a corresponding unpaid listing appears in the first unpaid listing position in the SERP, and (2) an actual revenue due to clicks on the designated paid ad and on the corresponding unpaid listing for a time period where no de-cannibalizing actions were taken, wherein a de-cannibalizing action occurs when a paid ad is not supplied to the search engine due to having a nonzero cannibalism score;

estimating a reclaimed ad spend for the designated paid ad as the difference between an estimate of the expected cost of purchasing the designated ad for a period of time and the actual cost reported for a comparable period of time during which de-cannibalizing actions were taken; and reporting the estimate of the reclaimed ad spend for an ad buy based on the generated cannibalism score.

2. The method of claim 1, wherein said gathering further comprises: gathering for the designated paid ad an average ad cost-per-click (CPC) for the period, an average click through rate (CTR) for the period, and the number of impressions for the period, the method further comprising:

calculating an expected ad spend for the designated paid ad for the period wherein the expected ad spend for the period is the CPC for the period * the CTR for the period * the impressions for the period;

wherein the reclaimed ad spend is the difference between the expected ad spend and the gathered actual cost for the period.

3. The method of claim 1, wherein the designated ad is the only ad purchased for the keyword during the period.

4. The method of claim 1, wherein the cannibalism score represents a measure selected from the group consisting of an estimate of the reduction in revenue to the advertiser due to the designated ad appearing in the same SERP as the corresponding listing, an estimate of the likelihood that a paid ad is cannibalistic, and a BOOLEAN value that indicates whether a paid ad is cannibalistic.

5. The method of claim 3, wherein the decision to supply the designated paid ad to the search engine is based on a threshold value applied to the cannibalism score for the designated paid ad.

6. The method of claim 1, wherein the reclaimed ad spend is aggregated for the period over all the gathered keywords.

7. The method of claim 2, wherein reclaimed ad spend is calculated for a plurality of search engines and is then aggregated over the plurality of search engines.

8. A server computer implemented on a cannibalistic advertising system (CAS), comprising:

a keyword gatherer for gathering: a plurality of keywords that are relevant to a designated advertiser, wherein each keyword corresponds to a paid ad that is supplied to a search engine, wherein a paid ad includes a link to a web page, wherein each web page is in a domain, and wherein in response to receiving a keyword from a web browser the search engine returns a corresponding search engine results page (SERP) that includes (i) at least one paid advertisement, and (ii) at least one unpaid listing, wherein an unpaid listing includes a link to a web page, and wherein a web page is within a domain and wherein a paid ad has an ad position within a web page in relation to other paid ads wherein the first ad position is the most valuable position and larger ad position values are less valuable and an unpaid listing has an unpaid listing position within a web page in relation to other unpaid listings wherein the first unpaid listing position is the most valuable position and larger unpaid listing position values are less valuable;

an ad database for storing (1) a paid ad for each of the plurality of keywords, (2) a cannibalism score for each paid ad, wherein a nonzero cannibalism score for a paid ad indicates that the paid ad appears in a first ad position in a SERP, there is no paid ad in a second ad position, and a corresponding unpaid listing appears in the first unpaid listing position in the SERP, wherein a corresponding unpaid listing includes a link to the same domain as the link included in the designated paid ad;
a cannibalistic ad analyzer for:
  determining an ad position for a designated paid ad and an unpaid listing position for each unpaid listing that corresponds to the designated unpaid ad, and wherein a position is an average position across multiple samples of the keyword that corresponds to the designated ad; and
  generating a cannibalistic ad score for the designated paid ad;
wherein the keyword gatherer additionally gathers an actual revenue due to clicks on a paid ad and on any corresponding unpaid listings in a SERP for a time period where no de-cannibalizing actions were taken, wherein a de-cannibalizing action occurs when a paid ad is not supplied to the search engine due to having a nonzero cannibalism score;
a reclaimed ad spend analyzer for estimating a reclaimed ad spend for a keyword as the difference between an estimate of the expected ad spend due to purchasing a paid ad corresponding to the keyword for a comparable period of time and the actual cost of purchasing the ad as reported for a comparable period of time during which de-cannibalizing actions were taken; and
a cannibalistic ad report generator for reporting the estimate of the reclaimed ad spend for an ad buy that based on the generated cannibalism score.

9. The server computer of claim 8, wherein said gathering further comprises: gathering for the keyword an average ad cost-per-click (CPC) for the period, an average click through rate (CTR) for the period, and the number of impressions for the period, and wherein estimating a reclaimed ad spend comprises:
  calculating an expected ad spend for the designated keyword for the period wherein the expected ad spend for the period is the CPC for the period * the CTR for the period * the impressions for the period; and
  wherein the reclaimed ad spend is the difference between the expected ad spend and the gathered actual cost for the period.

10. The server computer of claim 8, wherein the designated ad is the only ad purchased for the keyword during the period.

11. The server computer of claim 8, wherein the cannibalism score represents a measure selected from the group consisting of an estimate of the reduction in revenue to the advertiser due to the ad appearing in the same SERP as the corresponding listing, an estimate of the likelihood that an ad is cannibalistic, and a BOOLEAN determination as to whether a paid ad is cannibalistic.

12. The server computer of claim 11, wherein the decision to supply the designated keyword to the search engine is based on a threshold value applied to the cannibalism score for the designated keyword.

13. The server computer of claim 8, wherein the reclaimed ad spend is aggregated for the period over all the gathered keywords.

14. The server computer of claim 8, wherein the reclaimed ad spend is estimated for a plurality of search engines and is aggregated over the plurality of search engines.

15. The server computer of claim 8, wherein the physical location of the designated paid ad within the SERP is directly above the corresponding unpaid listing and there are no intervening paid ads or unpaid listings.

16. The method of claim 1, wherein the physical location of the designated paid ad within the SERP is directly above the corresponding unpaid listing and there are no intervening paid ads or unpaid listings.

17. The method of claim 1, wherein sampling the keyword that corresponds to the designated ad is performed by (1) issuing a search to a search engine using the keyword that corresponds to the designated ad, (2) receiving a SERP from the search engine, (3) determining the listing position of the designated paid ad in the SERP, and (4) determining the listing position of each unpaid listing in the SERP that corresponds to the designated ad.

18. The server computer of claim 8, wherein sampling the keyword that corresponds to the designated ad is performed by (1) issuing a search to a search engine using the keyword that corresponds to the designated ad, (2) receiving a SERP from the search engine, (3) determining the listing position of the designated paid ad in the SERP, and (4) determining the listing position of each unpaid listing in the SERP that corresponds to the designated ad.

* * * * *